April 12, 1960     C. B. DE VLIEG     2,932,131
TOOL GRINDER

Filed April 14, 1958     6 Sheets-Sheet 1

INVENTOR.
Charles B. DeVlieg
BY
Harness, Dickey & Pierce
ATTORNEYS.

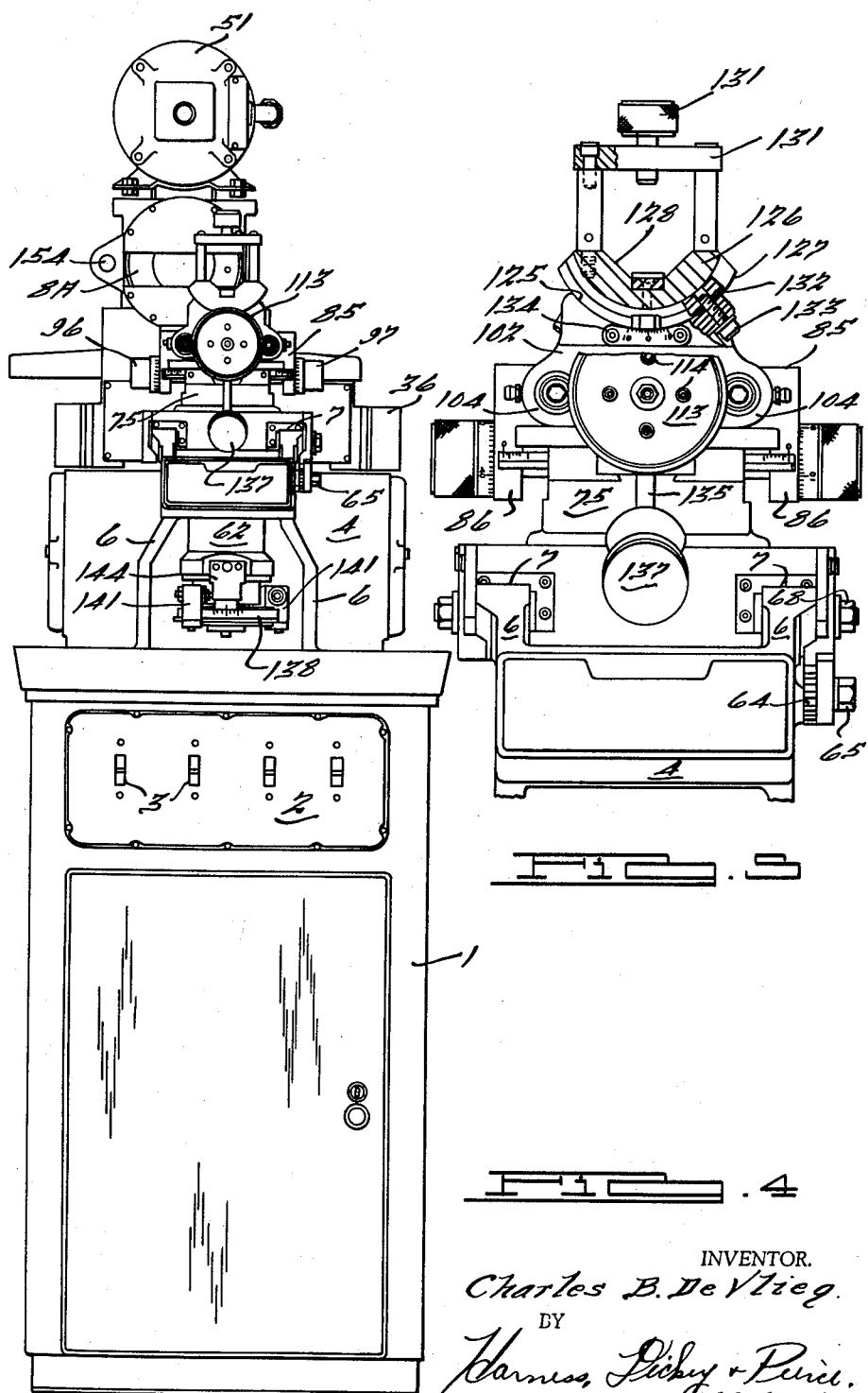

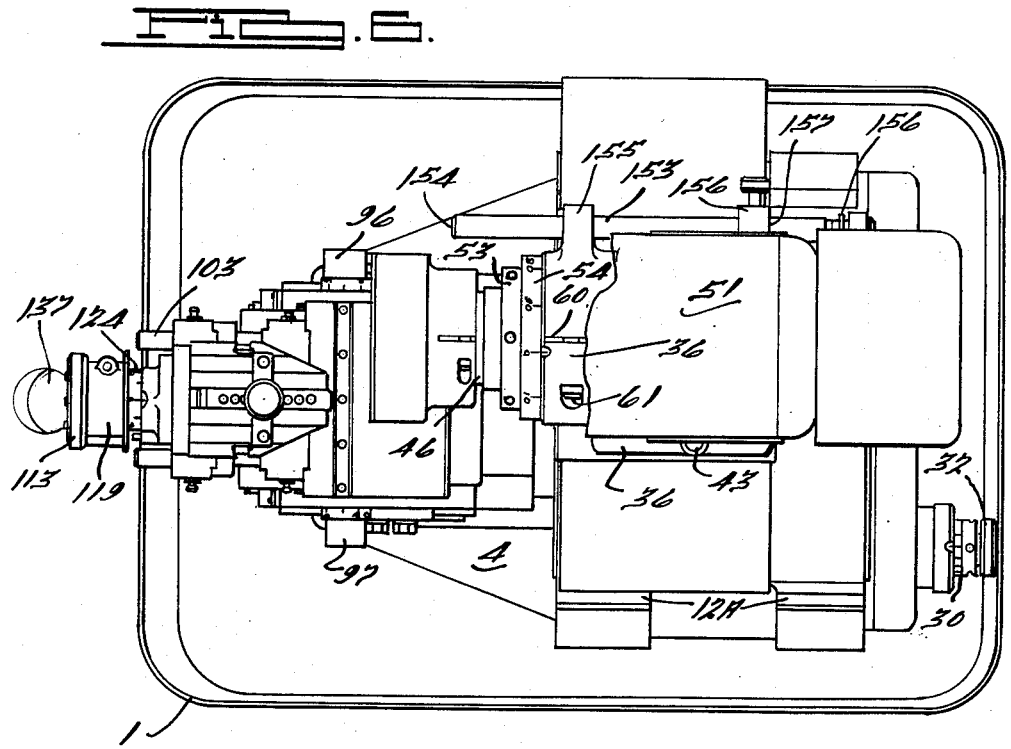
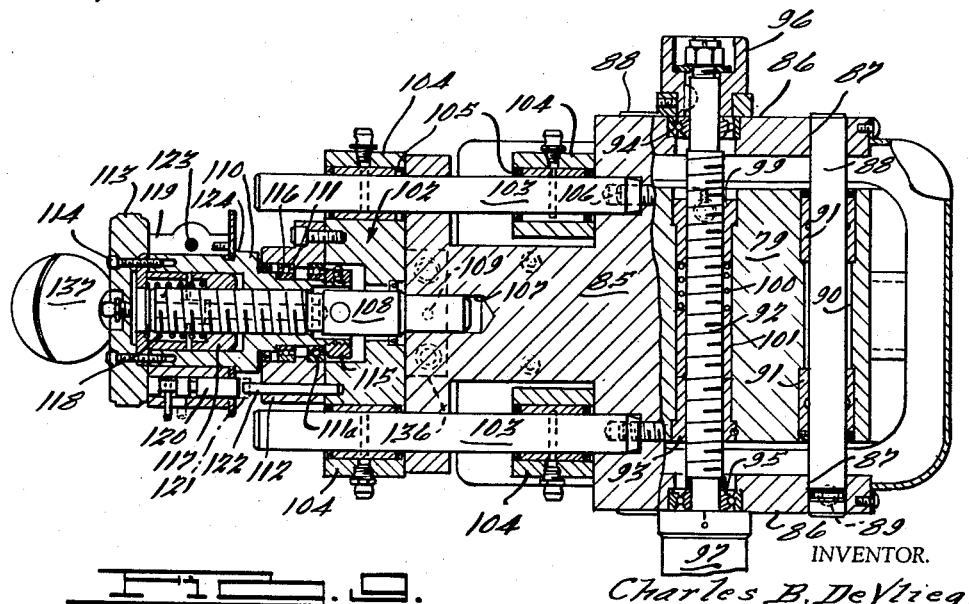

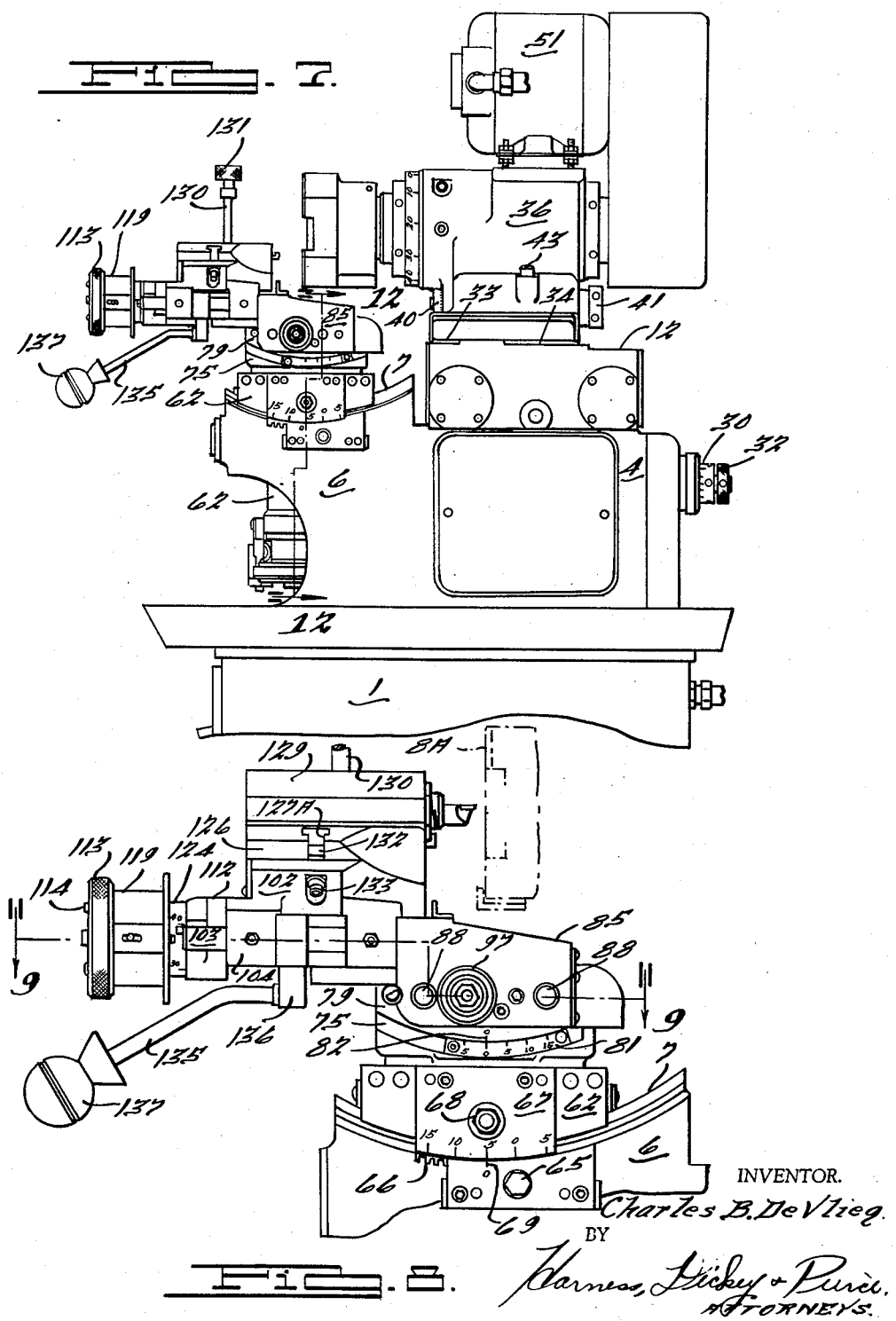

April 12, 1960

C. B. DE VLIEG 2,932,131

TOOL GRINDER

Filed April 14, 1958

INVENTOR.
Charles B. DeVlieg.
BY
Harness, Dickey & Pierce
ATTORNEYS.

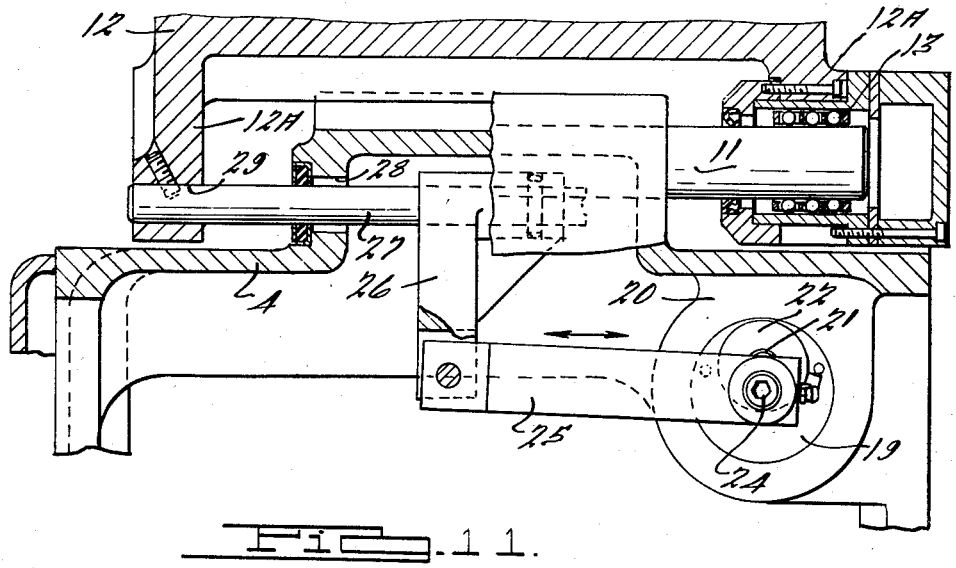

United States Patent Office 2,932,131
Patented Apr. 12, 1960

2,932,131

TOOL GRINDER

Charles Benjamin De Vlieg, Bloomfield Township, Oakland County, Mich., assignor to De Vlieg Machine Company, Ferndale, Mich., a corporation of Michigan Application April 14, 1958, Serial No. 728,121

12 Claims. (Cl. 51—56)

This invention relates to machine tools and, more particularly, to a tool grinder for accurately grinding, shaping, lapping and finishing cutting tools.

While not limited thereto, the device of the present invention has particular reference to a machine for grinding single point cutting tools formed from high speed steels, cast alloys, carbides, diamonds, ceramics or other suitable material. The machine of the present invention includes a grinding wheel and work holding fixture which may be rapidly and easily positioned relative to the grinding wheel to produce on the tool a variety of surfaces and cutting edges which are accurately located on the tool and which are disposed in specific, predetermined angular relationships.

In the design of a cutting tool for the performance of a particular job a number of important factors must be taken into consideration. While certain of the design features are dictated by the manner in which the tool is mounted and the form to be cut by the tool, an effort is also made to carefully control those design features which affect the tool's life between grindings and the quality of finish which the tool produces on the workpiece. In recent years significant strides have been made in the machine tool industry in producing machine tools which possess great inherent accuracy and are capable of continuous operation over long periods of time by means of automated controls. However, the accuracy of the work produced by such machines is limited by the suitability of the tool's design for the particular job and the geometrically accurate reproduction of that design in the tool. Furthermore, the machine can operate in an uninterrupted manner only as long as its cutting tools hold up without needing regrinding or replacement. Thus far, the cutting tool has proved to be the weak link in the chain, presenting substantial problems in the production of precision work and requiring excessive "down-time" in automated production equipment for the installation of sharpened cutting tools.

The problem has been not only the difficulty of maintaining accurate dimensions, but the grinders heretofore available have been limited in the range of configurations which could be accurately ground with any degree of convenience and rapidity. It frequently occurs that tool engineers make substantial sacrifices in accuracy and tool life in order to use standard tools which can be easily ground on the available grinders. However, if the capabilities available in modern machine tools are to be more fully utilized it becomes increasingly necessary to be able to conveniently and accurately grind on cutting tools a wide range of clearance angles, cutting edges and other precisely located surfaces and angles affecting the shape and finish of the work produced and the life of the cutting tool itself. It is, therefore, an object of the present invention to provide a tool grinder operable to expeditiously and accurately grind cutting tools in a manner affording an accurate and wide control over critical cutting tool dimensions and angular relationships.

It is another object of the present invention to provide a cutting tool grinder operable to accurately and conveniently grind clearance angles or relief angles and cutting edge angles on cutting tools in combinations and arrangements which heretofore have not been possible.

It is another object of the present invention to provide a cutting tool grinder capable of grinding cutting tools having longer tool life, operable to impart a better finish on the work cut thereby, and which are highly accurate in reproducing predetermined forms.

It is a further object of the present invention to provide a cutting tool grinder operable to grind the entire arcuate cutting edge of a single point cutting tool on one setup of the machine by oscillation of the cutting tool back and forth on an established axis.

It is a further object of the present invention to provide a cutting tool grinder on which all dimensions and angular characteristics of the cutting tool are preset on the grinder by mechanical means, thus eliminating the need for skilled workmen heretofore necessary to grind tools by off-hand methods.

It is an additional object of the present invention to provide a cutting tool grinder in which the dimensions and angular adjustments may be set by means of scales or dials on the machine, and which requires no separate templates or patterns formed according to the shape of the desired tool.

It is another object of the present invention to provide a cutting tool grinder in which the grinding surface of the cutting wheel is maintained flat and accurate by novel means for oscillating the wheel back and forth across its width on the portion of the tool being ground.

It is another object of the present invention to provide a cutting tool grinder which accurately and consistently will reproduce an exact cutting tool shape whereby cutting tools may be used interchangeably in a given machine.

It is an additional object of the present invention to provide a cutting tool grinder which will accurately remove a predetermined amount of stock from the cutting tool over a predetermined surface, whereby cutting tools may be ground and reset in machine tools without the necessity of re-gauging the tool.

It is another object of the present invention to provide a tool grinder of the above character which may also be readily used to grind the face of the tool, and impart any desired rake or hook to the face.

It is an additional object of the present invention to provide a cutting tool grinder which is rugged in construction and may be utilized over a long period of time without becoming out of adjustment, and which is operable to impart a keen cutting edge to a cutting tool in a precise manner.

Other objects and advantages of the present invention will become apparent from the following detailed description taken in conjunction with the accompanying drawings wherein:

Fig. 4 is a front elevational view of a grinding machine embodying the principles of the present invention;

Fig. 5 is an enlarged view partially broken away and partially in section of a portion of the structure illustrated in Fig. 4;

Fig. 6 is a plan view of the structure illustrated in Fig. 4;

Fig. 7 is an enlarged side elevational view of a portion of the structure illustrated in Fig. 4;

Fig. 8 is an enlarged view of a portion of the structure illustrated in Fig. 7 with a grinding block and cutting tool shown positioned in the work holding fixture;

Fig. 9 is a sectional view of the structure illustrated in Fig. 8 taken along the line 9—9 thereof;

Fig. 11 is a sectional view of the structure illustrated in Fig. 10 taken along the line 11—11 thereof;

Fig. 12 is a sectional view of the structure illustrated in Fig. 7 taken along the line 12—12 thereof; and Fig. 13 is a sectional view of the structure illustrated in Fig. 12 taken along the line 13—13 thereof.

Figure 1:
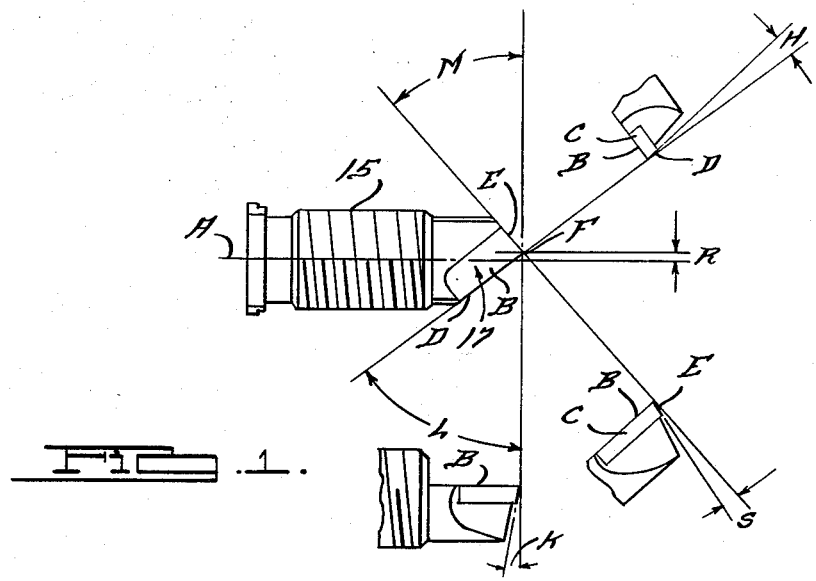
Figure 1 is a view of a cutting tool with projections illustrating the relief angles at various points along the cutting edges.

In order to properly identify the critical edges, angles and surfaces which are affected by grinding, a typical boring tool is illustrated in Fig. 1 with projections illustrating the various relief angles. A steel cartridge body or shank 15 is shown having a tip 17 of tungsten carbide or other suitable cutting material. Of course, it will be appreciated that the cutting edge of the tool could be formed directly on a shank of high speed steel or other cutting material, and in such case a separate tip would not be used. The cartridge illustrated in Fig. 1 is of a type designed for use in the construction disclosed in U.S. Patent No. 2,537,519 which permits accurate location of the tool's centerline A in a grinding block or boring bar. However, it will be understood that no particular design of shank or cartridge is required in order to grind a cutting tool on the machine of the present invention. By means of grinding blocks adapted to the various cartridge or shank designs the grinder of the present invention is instantly usable with a variety of cutting tools.

Figure 3:
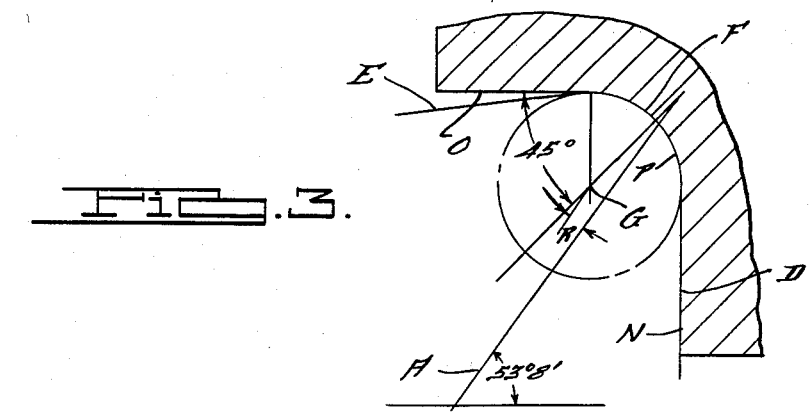
Fig. 3 is a fragmentary sectional view of a workpiece bore similar to Fig. 2 with a boring tool applied to the bore.
Figure 2:
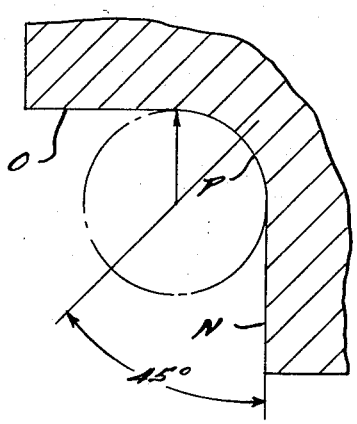
Fig. 2 is a sectional view of a workpiece bore illustrating the location of the nose radius.

The cutting face B of the cutting tool is a flat surface and forms the cutting edge of the tool at its juncture with the flank C of the tool. The cutting edge is made up of portions identified as the lead cutting edge D, end cutting edge E and nose radius F. The nose radius F defines a segment of a circle generated about a given center G, which is best seen in Figs. 2 and 3. The lead cutting edge D and the end cutting edge E are straight edges tangent to and disposed on opposite sides of the nose radius F. The angle at which the flank C is inclined from a position perpendicular to the face B at any given point on the cutting edge is called the relief angle (or the clearance angle) at that location. Thus, the relief angle along the lead cutting edge is called the lead cutting relief angle H. Similarly, the relief angle along the end cutting edge E is called the end cutting relief angle J and the relief angle at the midpoint of the nose radius is called the radius relief angle K. The angles which the lead cutting edge and end cutting edge make with a line drawn perpendicular to the centerline of the tool are called the lead cutting edge angle L and end cutting edge angle M, respectively.

Fig. 2 illustrates a typical workpiece bore such as might be produced by a boring tool of the type illustrated in Fig. 1. The workpiece has a shoulder N intersecting the wall O of the bore at a filet or rounded intersection P of a given radius. In a boring operation to produce this configuration the radius of the filet P will be determined by the size of the nose radius F of the cutting tool and the center of the radius of filet will be located by the center G of the nose radius. If the filet P is to be tangent to both the wall O and shoulder N (as it should be), the center of the filet radius must be on the bisector of the angle between said surfaces.

Fig. 3 illustrates the relationship of the cutting tool to the bore during the cutting operation. It will be seen that where the shoulder N is disposed at a 90% degree angle to the bore, the bisector on which the center of the arcuate filet must be located will be at a 45° angle to the bore (and thus 45° to the centerline of the bore). However, it frequently occurs that the cutting tool is not mounted in its boring bar at this 45 degree angle. In Fig. 3 the tool is shown mounted at an angle of 53°8', which is a typical mounting angle. The reason for this mounting angle is that 53°8' forms a perfect 3–4–5 right triangle and for every 5-thousandths of an inch the tool is moved along its centerline, the radius of the bore will be increased 4-thousandths of an inch. As may be seen in Fig. 3 the center G of the nose radius must be offset from the centerline A of the tool in order to produce the desired filet P. The magnitude of the offset, measured perpendicularly to the centerline of the tool, is called the radius offset R. The degree of offset necessary is determined by the angle of tool mounting and the size of the radius, and also by the initial offset which is designed into the tool. It will thus be appreciated that, for a given cutting tool, it is necessary to carefully locate the center G of the nose radius F, and accurately establish the size of the radius. Fig. 3 further exemplifies the need for accurately establishing the cutting edge angles. The lead cutting edge angle must be accurately established in order to bore a shoulder disposed at the proper angle to the wall of the bore.

Apart from the necessity of producing a cutting tool which will accurately reproduce desired forms, the design of a cutting tool is largely a question of obtaining a tool which will give a clean, smooth cut for as long a period as possible without regrinding. In addition to radius size, the relief angles are an important factor in this regard. The most desirable relief angles around the tool can vary considerably from one application to another and are frequently designed to precise dimension for a particular job by tool engineers. In general an effort is made to provide the nose radius with as much backing up and reinforcement as possible, for it is around the radius that the tool does the most cutting and bears the greatest stress. On the traditional bench grinder a uniform relief angle only could be ground on the tool and no provision was available for obtaining a greater or lesser relief angle on end cutting edge than on the side cutting edge. Further, the nose radius was established in size and location by the manual control of the individual doing the grinding. For modern precision machines the use of such inaccurate and limited methods is wholly unsatisfactory. More advanced grinders now in use provide for the tool to be pivoted or swung about the radius center G with the flank C contacting the wheel in order to grind the desired cutting edge. In order to alter the relief angle the tool is pivoted about a horizontal axis inclining the face of the tool to the grinding face. The axis on which the tool is pivoted is maintained vertical and parallel to the grinding face. Such a grinding method produces what may be called a cylindrical grind; that is, the flank C around the radius is disposed on a circular cylinder the axis of which is inclined to the tool face. However, this method cannot produce a constant relief angle. At the midpoint of the radius, with the tool directly facing the grinding wheel, the relief angle is greatest. But as the tool is pivoted to the right or left the relief angle being ground constantly decreases until a zero relief angle exists when the tool centerline is parallel to the grinding surface. This means that in order to produce relief angles on the end cutting edge and lead cutting edge of a particular amount, a greater relief angle will result around the radius. This weakens the tool at the point where it should be strongest.

Opposed to cylindrical grinding is what may be termed conical grinding. In this form of grinding the axis on which the tool is pivoted is inclined to the grinding face. This results in the flank around the radius being disposed on a cone having its axis extending through the radius center perpendicular to the face. Thus, the relief angle is uniform around the cutting edge and the nose radius need not be unnecessarily weakened. Tool grinders heretofore available for conical grinding, have suffered from an inability to accurately and readily establish the nose radius size and location, and from limitations on the range of relief angle which could be ground on the tool.

The machine of the present invention is capable of grinding conical reliefs, cylindrical reliefs, and combinations of the two, including means for making the nose radius relief angle less than side or end cutting edge relief angles. The grinder of the present invention is also capable of grinding any desired relief angles on opposite cutting edges. It is further within the scope of the aforementioned objects of the present invention to provide a tool grinder which by one setup of the machine can grind on a cutting tool any desired combination of relief angles which at the same time accurately controls the size of the nose radius, the location of the radius center, the end cutting edge angle, and the side cutting edge angle; and which assures a perfectly segmentally cylindrical nose radius with end and side cutting edges exactly tangent thereto.

Figure 10:
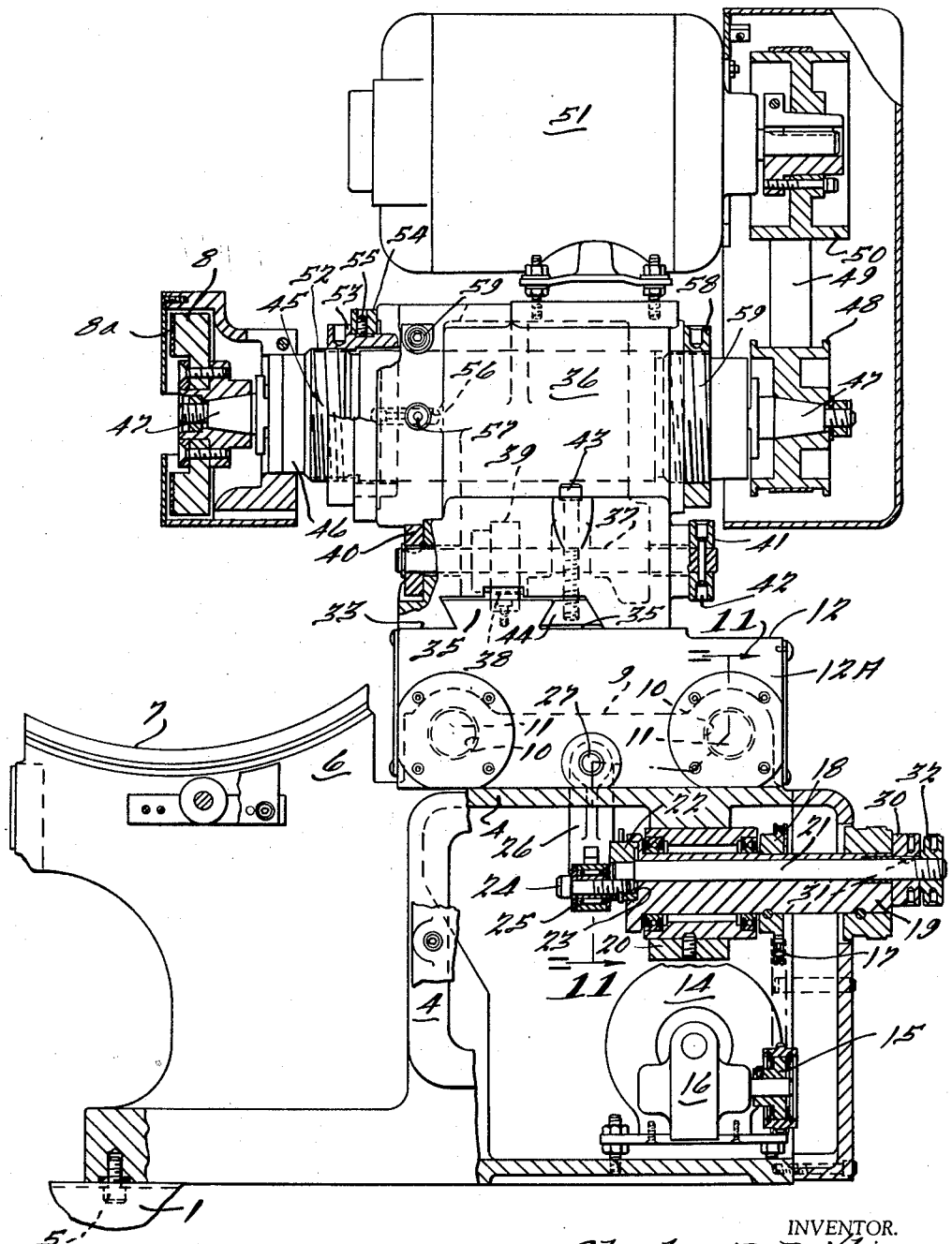
Fig. 10 is an enlarged side elevational view partially in section of a portion of the structure illustrated in Fig. 7.

Referring now to the drawings and, more particularly, to Figs. 4 and 10, the grinder embodying the principles of the present invention is adapted to rest on a stand 1 which positions the operating controls of the grinder at a convenient height for the operator and which also serves as a convenient storage compartment for the usual coolant tanks (not shown). A control panel 2 is also mounted on the stand 1 and includes switches 3 for actuation of the hereinafter described electric motors. A heavy cast metal base member 4 rests on the stand 1 and is secured thereto by suitable screws 5. The front of the base 4 is provided with a pair of spaced vertical ribs 6 terminating at their upper ends in arcuate supporting surfaces 7 disposed on a common circular cylinder having a horizontal axis extending transversely of the machine. The arcuate surfaces 7 serve to adjustably support the tool carrying and positioning structure which is shown in greater detail in Fig. 8, and which will be hereinafter described.

That portion of the machine supported on the base 4 to the rear of the ribs 6 relates to structure for supporting, positioning, reciprocating and driving a grinding wheel 8 having an annular grinding face 8A. A pair of laterally spaced vertical ribs 9 extend upwardly from the upper rear portion of the base member 4 and are provided with parallel bores 10 within which a pair of parallel guide bars 11 are fixedly supported. The guide bars 11 are horizontal, and extend transversely of the machine. A table 12 is supported on the guide bars 11 by means of two pairs of bearing units 13 secured in opposite side walls 14 thereof and may be reciprocated back and forth on the guide bars 11 in order to continuously move the entire grinding face 8A across the cutting tool in contact therewith and prevent excessive wear at one circumferential location on the grinding face. The table 12 is driven by an electric motor 14 which drives a sprocket 15 through a worm-type gear reduction unit 16. The sprocket 15 engages a chain 17 in order to drive a sprocket 18 fixedly mounted on a shaft 19. The shaft 19 is rotatably supported by a lug 20 integral with the base member 4, and internally carries an elongated rod 21 extending through its length eccentrically of its axis of rotation, so that it rotates about the axis of rotation of the shaft 19 when the shaft is driven by the motor 14. A retaining member 22 is secured to the left-hand end of the bar 21 as viewed in Fig. 10 and is provided with a bore 23 offset from the axis of the rod 21. A threaded pin or screw 24 is secured in the bore 23 and carries a lever 25 which is freely pivoted thereto. The opposite end of the lever 25 is freely pivoted to the lower end of an L-shaped bracket 26, the upper end of which is fastened to a draw bar 27. As may be seen in Fig. 11, the draw bar extends through openings 28 in the base 4 and into holes 29 formed in the table side walls 14. By means of set screws 29 the draw bar 27 is fixedly secured to the table 12.

The end of the rod 21 opposite from the lever 25 is provided with a graduated adjusting knob 30 fastened to the rod 21 by a key 31. Threaded on the rod 21 exteriorly of the adjusting knob 30 is a lock nut 32. When the lock nut 32 is loosened the adjusting knob may be rotated in order to rotate the bar 21 relative to the shaft 19. Such rotation moves the screw 24 about the axis of the bar 21 in order to vary its radial distance from the axis of rotation of the shaft 19. By such adjustment the path of travel of the screw 24 during rotation of the shaft 19 may be varied in order to set the distance the table 12 reciprocates. The graduations on the knob 30 indicate the distance of travel of the table for a given setting. Tightening of the lock nut 32 secures the rod 21 at the desired setting and prevents its rotation relative to the shaft 19. Thus, rotation of the shaft 19 effects rotation of the screw 24 about the axis of the shaft 19 which in turn causes reciprocation of the lever 25 laterally of the machine, as may best be seen in Fig. 11. Lateral movement of the lever 25 causes a similar movement of the bracket 26 which in turn moves the draw bar 27 back and forth. The draw bar 27, being secured to the table 12, causes the table 12 to reciprocate back and forth on the guide bars 11.

The upper surface of the table 12 is provided with a pair of spaced ways 33 and 34, separated by a rail 35 of inverted wedge shape, on which a grinding wheel spindle housing 36 rests for transverse adjusting movement relative to the table 12. While the table 12 may be reciprocated in order to move the width of the annular face 8A of the grinding wheel across the point of the cutting tool during the grinding operation, the grinding wheel spindle housing 36 is transversely adjustable relative to the table 12 in order to center either side of the grinding face 8A on the cutting tool and assure that the grinding face does not move off the tool during its reciprocation. Transverse adjustment of the grinding wheel spindle housing 36 is made by means of a shaft 37 extending longitudinally of the machine and carried by the housing 36 above the rail 35. A flat rack 38 is mounted on the top of the rail 35 so as to be engaged by a pinion 39 carried fast on the shaft 37. The front end of the shaft 37, which extends outwardly of the housing 36, carries a graduated dial member 40, which is fast thereto. The opposite end of the shaft 37 is provided with a collar 41 having a plurality of socket holes 42, within which a bar may be inserted to rotate the shaft and thereby effect transverse movement of the housing 36 by movement of the pinion 39 along the rack 38. The dial 40 is calibrated so as to indicate the position of the housing 36 with respect to the table 12. Once the housing 36 has been moved to the desired position it may be locked by means of a screw 43 which draws a gib 44 against the rail 35.

The grinding wheel spindle housing 36 is adapted to support a spindle cartridge unit 45, which includes an outer body member 46 and an internal shaft 47 rotatably supported within the body member 46. The grinding wheel 8 is secured to the forward end of the shaft 47, while the rear end of the shaft 47 has a pully 48 secured thereto which is engaged by a belt 49 driven by a pully 50 drivably connected to an electric motor 51.

The cartridge unit 45 is disposed with its axis extending longitudinally of the machine and horizontal. In order to adjust the radius of arcuate cutting edges on the cutting tool the entire cartridge unit 45 is adjustable along its axis in order to vary the longitudinal position of the grinding face 8A while the pulley 48 is sufficiently wider than the drive 49 to permit such movement. This adjustment is accomplished by a threaded collar 52 integrally formed on the cartridge body 46, which threadably engages an internally threaded ring 53 carrying a graduated collar 54 which may be set in any given position around the ring 53 by a set screw 55. An elongated slot 56 is formed in the side of the body member 46 rearwardly of the threaded shoulder 52 within which a key 57, extending through the housing 36, is positioned. The body member 46 is thus secured against rotation, yet is capable of longitudinal movement the length of the key slot 56. Rotation of the ring 53 thereby effects longitudinal movement of the entire cartridge unit 45. In order to fixedly position the cartridge unit 45 once the desired position has been reached, a lock nut 58 threadably engaging a threaded shoulder 59 on the rear end of the body member 46 may be tightened against the housing 36. In addition, the housing 36 is split as indicated, at 60, in Fig. 6 and a screw 61 joining the split portions of the housing 36 may be tightened in order to clamp the cartridge unit 43 therebetween.

Referring now to Fig. 8, that part of the grinder adapted to position and support the cutting tool to be ground rests on the arcuate base surfaces 7. A pivot axis adjusting member 62 is provided with arcuate lower surfaces 63 conformably shaped to and resting on the base surfaces 7. The surfaces 63 are disposed on the same circular cylinder as the surfaces 7. As the surfaces 63 are slid over the supporting surfaces 7 the member 62 is moved or pivoted about its axis which is the axis of the arcuate surfaces 63 and 7. In order to accomplish the adjustment of the member 62 a pinion 64 is rotatably mounted on one of the ribs 6 by means of a stud 65, so as to drivably engage an arcuate rack 66 formed on a plate 67 fastened to one side of the member 62. The stud 65 may be rotated to rotate the pinion 64 and thus move the member 62. The plate 67 is scaled in degrees so as to be read with reference to a fixed zero point 69 in order to determine the angular inclination of the member 62 from the vertical. The member 62 may be secured in the desired position of inclination by means of a nut 68 which when tightened wedges the plate 67 against the ribs. A second plate 67A and nut 68A are also positioned on the opposite side of the member 62 and may be locked in a similar manner.

Rotatably supported within the member 62 by means of combined thrust and radial bearing units 70 and 71 is a work spindle 72. The upper end 73 of the spindle 72 is disposed above the member 62 while the lower end 74 of the spindle 72 extends downwardly beneath the member 62 between the ribs 6 of the base 4. The spindle 72 is freely pivotable with respect to the member 62 on an axis intersecting the axis of the member 62 at right angles thereto. As the pivot axis adjusting member 62 is adjusted to various inclinations it carries the spindle 72 with it and inclines its pivot axis with respect to the vertical. When the pivot axis of the spindle 72 is exactly vertical, the scale 67 on the side of the pivot axis adjusting member 62 indicates zero degrees of inclination.

A supporting member 75 is secured to the upper end 73 of the spindle 72 by means of screws 76, and is provided at its upper surface with a pair of arcuate ways or surfaces 77, separated by a guide rail 78. The surfaces 77 are disposed on a circular cylinder having a horizontal axis perpendicular to the pivot axis of the spindle 72 and intersecting the pivot axis of the spindle 72 and the axis of the member 62 at their intersection. Supported on the surface 77 is a tool inclination adjusting member 79 having arcuate lower surfaces 80 conformably shaped to and resting on the surface 77 for arcuate movement of the member 79 about the axis of the surfaces 80. The member 79 is thus angularly adjustable relative to the supporting member 75 in order to incline the member 79 relative to the pivot axis of the spindle 72. The degree of inclination may be read on a scale 81 mounted on the side of the supporting member 75, which is read against a zero point 82 marked on the side of the member 79. In order to lock the member 79 in any given angular position relative to the supporting member 75 a wedge 83 is positioned within the member 79, which may be screwed against a gib 84 in order to clamp the gib 84 against the rail 78 of the supporting member 75.

From the foregoing it may be seen that the pivot axis adjusting member 62, the work spindle 72 and the tool inclination adjusting member 79 all move on axes which intersect at a common point. This point remains constant and unchanging for all adjustments and movements about said axes, and, for purposes of describing the setup and operation of the grinder, it may be labeled as the "point of axis intersection."

In order to position the radius center of an arcuate cutting edge of the cutting tool at a particular lateral location on the cutting tool, such as to offset the radius center G from the centerline of the tool, a transverse slide 85 is supported on the member 79. The slide 85 has a pair of parallel depending side portions 86 disposed longitudinally along the opposite sides of the member 79 and provided with two pairs of aligned openings 87. A pair of identical transverse guide bars 88 are supported between the side portions 86 with their opposite ends disposed in the openings 87. The guide bars 88 are fixed relative to the slide 85 by means of set screws 89. The member 79 is provided with two parallel bores 90 extending transversely therethrough, and within which the guide bars 88 are slidably supported by means of sleeve bearings 91. Calibrated transverse adjustment of the slide 85 relative to the member 79 is made by means of a screw 92 extending transversely through the member 79 and threadably engaging a nut 93 fixedly positioned therein. The screw 92 is rotatably supported between the slide side portions 86 by means of bearings 94 and 95 and is provided with calibrated knobs 96 and 97 secured to the opposite ends thereof, which prevent axial movement of the screw 92 relative to the slide 85 by their abutment with the slide side portions 86. Thus, rotation of either of the knobs 96 or 97 causes the screw 92 to advance through the fixed nut 93 carrying the slide 85 with it. Calibrations on the knob 97 which may be read against a reference point on the adjacent slide side portion 86 serve to indicate the distance the slide 85 travels. In order to take up the clearance between the threads of the screw 92 and the threads of the nut 93 a second nut 99, non-rotatable but slidably fixed in the member 79, threadably engages the screw 92 and is spaced from the nut 93 by a coil spring 100 and a spacer member 101. The spring 100 causes the nut 99 to bear against the opposite flank of the thread of screw 92 and eliminates the possibility of screw back-lash.

In order to advance the cutting tool into engagement with the grinding face 8A a feed slide 102 is supported on the transverse slide 85 by means of a pair of spaced parallel guide bars 103. The feed slide 102 is provided with aligned pairs of depending apertured lugs 104 carrying bearings 105 which slidably engage the guide bars 103. The guide bars 103 are fixedly mounted in the transverse slide by screws 106. In order to advance the feed slide 102 along the guide bars 103 the forward end of the transverse slide 85 is provided with a bore 107, within which one end of a screw 108 is secured by a pin 109 so as to be held against rotational or axial movement. The screw 108 extends through the feed slide 102 and is threadably engaged by a sleeve-like nut member 110 which is rotatably supported through bearings 111 and 111A carried by a bracket 112 fastened to the feed slide 102. The free end of the nut 110 has a knob 113 secured thereto by screws 114 for convenient manual operation of the nut 110. The opposite end of the nut 110 is provided with a bearing lock nut 115 threaded thereon and a shoulder 116 which trap the bearings 111 therebetween. The bracket 112, in which the bearings 111 are housed, and the feed slide 102 are thus secured to the nut 110 for movement with the nut 110 axially of the screw 108. As may best be seen in Fig. 9, the left-hand end of the nut 110 is enlarged and radially spaced from the screw 108. Within this space an anti-backlash nut 117 threadably engages the screw 108 and is urged in a right hand direction by means of a coil spring 118. By this means any excess play between the threads of the screw 108 and nut 110 is taken up and the flanks of the threads on the screw 108 remain in driving engagement with the threads of the nut 110.

In order to limit the feed of the tool into the grinding wheel a collar 119 is positioned around the nut 110 adjacent the knob 113 and carries a pin 120 which may be extended to the position shown in dotted lines at 121 in Fig. 9, so as to abut a finger 122 fixedly secured in the bracket 112 and thereby prevent further rotation of the nut 110. The collar 119 is split, with the separate ends being joined by a screw 123 which may be loosened to position the pin 120 at any circumferential location around the nut 110. A scale is provided on the nut 110 at 124 which may be read against a reference point on the bracket 122 in order to determine the amount of infeed of the tool for a given movement of the nut 110.

The feed slide 102 is provided on the top thereof with an arcuate supporting surface 125 disposed on a circular cylinder having its axis disposed perpendicularly to the axis of the tool inclination adjusting member 79. Adjustably supported on the surface 125 is a work holding fixture 126 having an arcuate lower surface 127 conformably shaped to and resting on the arcuate surface 125, whereby the fixture 126 may be pivoted on the feed slide about the last mentioned axis. By correct setting of the transverse slide 85, the axis of the fixture 126 may be positioned to intersect the "point of axis intersection" and when in such position the transverse slide 85 may be said to be in the "zero" offset position. The work holding fixture 126 is provided with a V-shaped supporting surface 128 on which a suitable grinding or holding block is positioned, such as is indicated at 129 in Fig. 8. The V supporting surface 128 is so shaped and positioned that when used with a grinding block of appropriate size and shape the centerline A of the grinding tool will be coincidental with the axis of the tool fixture 126 and thereby intersect the "point of axis intersection" when the grinder is set at the zero offset position. The tool fixture includes a yoke 130 carrying a clamp screw 131 by means of which the grinding block 129 may be secured to the tool fixture 126.

The bottom of the tool fixture 126 is provided with a transverse arcuate T slot open to the arcuate surface 125 and which is slidable over a T nut 132. A screw 133 positioned in the feed slide 102 threadably engages the T nut 132, and together with the nut 132 serves as a clamp for locking the fixture 126 in any desired position. As may be seen in Fig. 5 the tool fixture 126 may be pivoted about its axis in order to laterally incline the cutting tool. The degree of this inclination may be read on a scale 134. By thus laterally tilting the cutting tool, variations may be had in the relief angle ground on opposite cutting edges of the cutting tool.

In order to pivot the tool about the pivot axis of the work spindle 72 and thus present the entire cutting edge of the tool to the grinding face 8A a lever 135 is provided which is secured at its one end to the underside of the transverse slide 85 by a bracket 136, and has a knob 137 at its opposite end.

In order to establish the limits of the tool's pivotal movement about the pivot axis of the spindle 72, the lower end 74 of the spindle 72 carries a circular disk 138 which is made fast to the spindle 72 by means of a screw 139 and key 140. Two adjustable limit blocks 141 are slidably carried on the circumference of the disk 138 and may be secured in any circumferential position therearound by means of screws 142. Each limit block 141 carries a pin 143 adapted to abut the side of an abutment member 144 in order to limit the pivotal movement of the spindle 72 in one direction. By positioning of the limit blocks 141 the extent of pivotal movement of the spindle 72 in either direction may be automatically controlled and the end cutting edge angle and side cutting edge angle of the cutting tool thereby established. Graduations in degrees are provided on the circumference of the disk 138 by means of which the limit blocks 141 may be accurately positioned and which may also be read against a reference point on the abutment member 144 in order to tell at a glance the angle through which the tool has been pivoted.

In order to make minor adjustments in the positioning of the pins 143 and also to help prevent abrupt slamming against the abutment member 144, each of the pins 143 is mounted in the manner shown in Fig. 13. A cartridge 145, having a bore 146 in which the pin 143 is slidably disposed, is provided with opposed keys 147 which are slidably fitted in grooves or keyways 148 formed in the block 141. The cartridge 145 is threaded at both its ends in order to receive a lock nut 149 and a calibrated, internally threaded dial 150 which bear against opposite sides of the block 141 and secure the cartridge 145 in place. By loosening the nut 149 and rotating the dial 150, the cartridge 145 may be advanced or retracted to make minor adjustments in the tool lead cutting edge L or end cutting edge M, depending on which side of the disk the limit block is on.

A spacer member 151 is secured within the cartridge 145 in spaced alignment with the pin 143. A coil spring 152 maintains the pins 143 spaced from the spacer 151 and in an extended position. When the pin 143 engages the abutment member 144 the spring 152 is compressed and a resistance may be felt by the grinder operator indicating that the swing is almost at an end. The operator may then slowly finish the swing until the pin 143 is seated against the spacer 151. Thus distorting deflections of the machine and possible damage to the cutting edges of the tool are avoided.

Prior to using the grinder it must be established that the point of axis intersection lies in the plane of the grinding face 8A when the grinding wheel spindle gauge 54 is in its zero position. In order to accurately establish this setting when a new grinding wheel is installed on the machine or after a period of use when the grinding face 8A has become worn, use is made of a gauge bar 153 having a flat face 154 on the forward end thereof. As may be seen in Fig. 6 the gauge bar 153 is slidably carried in a horizontal, longitudinally extending position by brackets 155 and 156 integrally formed on the spindle housing 36. During normal operation of the grinding machine the bar 153 is in the retracted position illustrated in Fig. 6. However, in order to gauge the location of the grinding face 8A the gauge bar 153 is pulled forwardly until a collar 156 formed thereon abuts a surface 157 of the bracket 156. In this position the forward face 145 of the bar 153 will lie in a transverse horizontal plane intersecting the point of axis intersection. By means of a separate gauge having three aligned legs, two of which are rested on opposite sides of the grinding face 8A and one of which is rested on the face 154, the grinding face 8A may be aligned in the same transverse plane with the face 145. With the grinding face 8A in this position, the set screw 55 is loosened and the graduated collar 54 is reset on the threaded ring 53 at the zero position. Thereafter the position of the grinding face 8A with respect to the point of axis intersection may be read directly on the graduated collar 54. The ring 53 may then be rotated to move the grinding face 8A rearwardly the desired amount, to establish the size of the nose radius of the cutting tool. The distance of the grinding face 8A from the point of axis intersection will exactly determine the size of the radius being ground, with the exception of one compensation factor which is yet to be mentioned.

In order to assure even wear on the annular face of the grinding wheel, the grinding wheel reciprocating mechanism is adjusted by loosening the lock nut 32 and turning the knob 30 to set the desired amount of reciprocation, which amount should be no greater than the width of the grinding face 8A. The grinding face 8A should also be centered on the cutting tool, which is accomplished by loosening of the lock screw 43 and positioning the spindle housing 36 relative to the table 12. The spindle housing 36 is thereafter locked in place relative to the table 12 by rightening of the screw 43.

The desired end cutting edge angle and lead cutting edge angle are next set at the desired amounts by positioning of the limit blocks 141 on the disk 138 secured to the work spindle 72. The amount of offset of the center G of the nose radius from the centerline of the tool may next be established by rotation of the knobs 96 and 97 to move the transverse slide 85 relative to the tool inclination member 79. By this means the centerline A of the cutting tool will pass laterally of the point of axis intersection and the center G of the nose radius F will coincide with the point of axis intersection.

Having made the above adjustments the desired relief angles may be set by the adjustment of the pivot axis adjusting member 62, the tool inclination member 79 and the work holding fixture 126. Which of these three adjustments are utilized and the amount of such adjustments is dependent on the particular relief angles desired. But regardless of what adjustments are made on the grinder to obtain the desired relief angle, the point of axis intersection remains the same and radius size and offset which have been established are not destroyed. While it is necessary to make small compensating adjustments on the radius offset and radius size in two particular situations such adjustments may be readily made by reference to established tables and present no real problem.

In order to illustrate the use of the adjustments relating to the control of the relief angles, several different types of grinding problems may be assumed.

If it is desired to impart a cylindrical relief angle to the nose radius, with the relief angle at the nose radius being somewhat greater than the relief angle of the side cutting edge and lead cutting edge, then the pivot axis adjusting member 62 is left in its zero position (that is, with the pivot axis of the shaft 72 vertical). The tool inclination adjustment member 79 is inclined to the relief angle desired on the nose radius. The tool is then fed into the grinding face and swung about the pivot axis by means of the lever 135. The end cutting relief angle and the side cutting relief angle will be less than the nose radius relief angle, with the end cutting relief angle and side cutting relief angle decreasing as the end cutting angle and lead cutting angle are increased. For example, if the tool inclination adjusting member is set at 14° 40′, this will be the nose radius relief angle. However, the relief angle on a 45° end or lead cutting edge will be 10°. If it is desired to increase the relief angle obtained on one side of the tool and decrease the relief angle on the other side of the tool the work holding fixture 126 may be inclined about its axis for accomplishing this purpose. Adjustment of the work holding fixture 126 will not effect the relief angle obtained on the nose radius, but becomes operative only as the tool is swung from a position perpendicular to the grinding face. By this means, the amount of relief angle taken off one side of the cutting edge may be added on to the other side.

The grinder may be utilized to accomplish the aforementioned conical relief angle around the nose radius. For this purpose the tool inclination adjusting member 79 is left in its zero position (that is, with the pivot axis 72 perpendicular to the centerline of the tool). The pivot axis adjusting member 62 is then inclined the desired number of degrees, which, of course, inclines the pivot axis of the spindle 72 to the grinding face 8A. The resulting relief angle will be the same at any point around the cutting edge irrespective of the end cutting edge angle and the lead cutting edge angle.

Where it is desired to place a lesser relief angle on the nose radius than on the lead cutting and end cutting edges, both the pivot axis adjusting member 62 and the tool inclination adjusting member 79 may be adjusted. As has been previously stated, the relief angle imparted by the tool inclination adjusting member 79 constantly decreases as the centerline of the tool approaches a position of parallelism with the grinding face. This tendency of the member 79 to cancel itself out, so to speak, may be utilized to advantage by putting a given amount of relief angle on the member 62 and then inclining the member 79 in the opposite direction to take a part of the relief off of the tool. Thus, when the tool is swung about the pivot axis the effective negative angle on the member 79 will be reduced and the resulting relief angle produced on the end and lead cutting edges will be increased. For example, if an inclination of 10° is put on the member 62 and the member 79 is inclined rearwardly 7°20′ the resulting nose radius relief angle will be 2°40′. However, as the tool is pivoted to end and lead cutting edges of, for example, 45° the resulting relief angle will be 5°. The reason for this is that the member 62 still gives an effective inclination of 10° at any end or lead cutting angle. However, at a 45° cutting angle, the effective inclination of the member 79 is reduced to 5° (which in this example is negative). Thus 5° subtracted from ten degrees, leaves a relief angle of 5°. The decrease in relief angle imparted to the tool for a given setting of the member 79 when pivoted to a particular cutting edge angle may be computed by solid trigonometry and tables of such computations may be supplied with the grinder for convenient use by users of the grinder.

It may be noted that when the pivot axis adjusting member 62 is inclined the tool is fed toward the grinding face at an inclined angle and, thus, the radius of the arcuate "nose radius" F is disposed on a line beginning at the point of axis intersection and extending angularly upwardly to the grinding face. Yet, the setting of the nose radius size by adjustment of the spindle cartridge 45 actually measures a distance from the point of axis intersection perpendicularly to the grinding face. However, at eight degrees of inclination the variation between the radius set and that obtained would amount to less than one percent, which may be either allowed for or disregarded depending on the accuracy desired.

It frequently occurs that the face B of the cutting tool is not disposed on the centerline of the tool, but rather is located above the centerline. When this condition exists, adjustment of the member 62 will increase the radius size produced on the tool above that set on the wheel spindle cartridge 45 and inclination of the work holding fixture 126 will offset the center of the radius from its intended position. However, both of these situations may be readily compensated for by the use of charts supplied for that purpose or by "rule of thumb."

As has been previously noted, inclination of the pivot axis of the spindle 72 to the grinding face 8A by adjustment of the member 62 results in a conical surface being ground on the flank around the nose radius. When the face of the tool is above the tool's centerline (and thus above the point of the radius axis intersection), the nose radius F will be higher up on the cone than the point at which it is calibrated by adjustment of the grinding wheel spindle cartridge 45. For example, the increase in radius for a five degree inclination of the pivot axis is known to be one one-thousandth of an inch for every ten one-thousandths of an inch of the tool face above the tool's centerline, and the grinding face 8A may be moved toward the point of axis intersection an appropriate amount to compensate for this error.

When a tool having its face above its centerline is pivoted about its centerline by inclination of the fixture 126, the center of the tool face will be moved laterally with respect to the point of axis intersection and thus the nose radius will be generated about a point offset from that intended. In order to compensate for this factor the transverse slide 85 must be adjusted to bring the radius center G back to the proper place on the tool. The amount of compensation necessary for a given inclination and heighth above center may be solved by trigonometry and the results computed in table form for convenient usage by the grinding operator.

Once all adjustments have been made on the grinder, the tool is fitted in a grinding block such as is shown at 129 and clamped in the fixture 126. The knob 113 is then rotated to feed the tool into the grinding face 8A. When contact is made the tool is then swung about its pivot axis (the axis of the spindle 72) by the lever 135 in order to grind the entire cutting edge. If it is desired to remove a desired amount of stock, the infeed after initial contact may be read on the scale 124.

The tool grinder embodying the features of the present invention may also be used to grind the face B of the tool, in addition to the flank C. In order to accomplish this operation, the tool holding or grinding block 129 is positioned in its fixture 126 so that the face B is vertical rather than horizontal. The tool is then pivoted on the pivot axis so that the face B faces the grinding face 8A. By setting the appropriate limit block 141 at 90° the face may be held parallel to the grinding face. When in this position the feed slide 102 will be disposed parallel to the grinding face and would only move the tool parallel to the grinding wheel. However, the transverse slide 85, which is now disposed longitudinally of the machine, may be used to feed the face into the grinding surface. It sometimes occurs that some degree of "rake" or "hook" is desired on the tool face. Rake is inclination of the face laterally of the tools centerline, while hook is inclination of the face in a direction longitudinally of the centerline. An angle less than 90° may be set on the limit block 141 to produce the desired amount of hook, while the tool fixture may be adjusted about its axis to obtain the desired amount of rake.

The transverse slide 85 may be used to feed the tool into the grinding face 8A in a situation other than face grinding. This is where the lead cutting edge angle is ninety degrees. It will be apparent that when this edge is presented to the grinding face, actuation of the feed slide 102 would only serve to move the edge parallel to the grinding face. However, operation of the slide 85 will accomplish the desired feed.

While it will be apparent that the preferred embodiment herein disclosed is well calculated to fulfill the objects above stated, it will be appreciated that the invention is susceptible to modification, variation and change without departing from the proper scope or fair meaning of the subjoined claims.

What is claimed is:

1. A tool grinder for grinding arcuate cutting edges about a pivot axis including a base, a pivot axis adjusting member carried by said base and arcuately movable about a first axis, a supporting member, a pivotal connection between said supporting member and said pivot axis adjusting member defining a pivot axis intersecting said first axis at right angles thereto, a tool inclination adjusting member carried by said supporting member and arcuately movable about an axis intersecting said pivot axes at right angles thereto and also said first axis at its intersection with the pivot axis, a tool-holding fixture carried by said tool inclination adjusting member adapted to hold a tool with its cutting edge in the vicinity of the point of intersection of said axes, and means for supporting a grinding wheel with its grinding face adjacent the point of intersection of said axes.

2. A tool grinder for grinding arcuate cutting edges about a pivot axis including a base, a pivot axis adjusting member carried by said base and arcuately movable about a first axis, a supporting member, a pivotal connection between said supporting member and said pivot axis adjusting member defining a pivot axis intersecting said first axis at right angles, a tool inclination adjusting member carried by said supporting member and arcuately movable about an axis intersecting said pivot axes at right angles thereto and also said first axis at its intersection with the pivot axis, a tool-holding fixture carried by said tool inclination adjusting member adapted to hold a tool with its cutting edge in the vicinity of the point of intersection of said axes, and means for adjustably supporting a grinding wheel adjustable to vary the position of the grinding surface of the grinding wheel with respect to the point of axis intersection in order to establish the radius of an arcuate cutting edge to be ground.

3. A tool grinder for grinding arcuate cutting edges about a pivot axis including a base, a pivot axis adjusting member carried by said base and arcuately movable about a first axis, a supporting member, a pivotal connection between said supporting member and said pivot axis adjusting member defining a pivot axis intersecting said first axis at right angles, a tool inclination adjusting member carried by said supporting member and arcuately movable about an axis intersecting said pivot axes at right angles thereto and also said first axis at its intersection with the pivot axis, a tool-holding fixture carried by said tool inclination adjusting member adapted to hold a tool with its centerline disposed perpendicularly to the axis of said tool inclination adjusting member and intersecting the point of intersection of the aforesaid axes, and means for supporting a grinding wheel with its grinding face adjacent the point of intersection of said axes.

4. A tool grinder for grinding arcuate cutting edges about a pivot axis including a base, a pivot axis adjusting member carried by said base and arcuately movable about a first axis, a supporting member, a pivotal connection between said supporting member and said pivot axis adjusting member defining a pivot axis intersecting said first axis at right angles thereto, a tool inclination adjusting member carried by said supporting member and arcuately movable about an axis intersecting said pivot axes at right angles thereto and also said first axis at its intersection with the pivot axis, a tool-holding fixture supported on said tool inclination adjusting member, a transverse slide disposed intermediate said supporting member and said tool-holding fixture movable on an axis parallel to the axis of said tool inclination adjusting member to adjust the transverse position of said tool fixture relative to said pivot axis, and means for supporting a grinding wheel with the grinding surface thereof adjacent the point of intersection of said axes.

5. A tool grinder for grinding arcuate cutting edges about a pivot axis including a base, a pivot axis adjusting member carried by said base and arcuately movable about a first axis, a supporting member, a pivotal connection between said supporting member and said pivot axis adjusting member defining a pivot axis intersecting said first axis at right angles thereto, a tool inclination adjusting member carried by said supporting member and arcuately movable about an axis intersecting said pivot axes at right angles thereto and also said first axis at its intersection with the pivot axis, a tool-holding fixture carried by said tool-holding adjusting member adjustable about an axis intersecting the point of intersection of the aforesaid axes at right angles to the axis of said tool inclination adjusting member, said fixture being adapted to hold a cutting tool with its cutting edge in the vicinity of the point of intersection of said axes, and means for supporting a grinding wheel with its grinding face adjacent the point of intersection of said axes.

6. A tool grinder for grinding arcuate edges about a pivot axis including a base, a supporting member pivotally carried by said base, a tool inclination adjusting member carried by said supporting member and arcuately movable about an axis intersecting the pivot axis of said supporting member at right angles thereto, a tool-holding fixture carried by said tool inclination adjusting member adapted to hold a tool with its cutting edge in the vicinity of the point of intersection of said axes, means for supporting a grinding wheel with its grinding face adjacent the point of intersection of said axes, and feed means for advancing said tool-holding fixture relative to the point of axis intersection and at right angles to the axis of said tool inclination adjusting member.

7. A tool grinder for grinding arcuate cutting edges about a pivot axis including a base, a pivot axis adjusting member carried by said base and arcuately movable about a first axis, a supporting member, a pivotal connection between said supporting member and said pivot axis adjusting member defining a pivot axis intersecting said first axis at right angles thereto, a tool inclination adjusting member carried by said supporting member and arcuately movable about an axis intersecting said pivot axes at right angles thereto and also said first axis at its intersection with the pivot axis, a tool-holding fixture carried by said tool inclination adjusting member adapted to hold a tool with its cutting edge in the vicinity of the point of intersection of said axes, means operable to move said tool-holding fixture in a direction toward the point of intersection of said axes perpendicular to the axis of said tool inclination adjusting member, and means for supporting a grinding wheel with its grinding face adjacent the point of intersection of said axes.

8. A tool grinder for grinding arcuate cutting edges about a pivot axis including a base, a pivot axis adjusting member carried by said base and arcuately movable about a first axis, a spindle carried by said pivot axis adjusting member and pivotable on an axis intersecting the axis of said pivot axis adjusting member at right angles thereto, limiting means carried by said spindle, abutment means engageable with said limiting means, one of said means being circumferentially adjustable about the axis of said spindle to limit the pivotal movement of said spindle in one direction, a supporting member carried by said spindle at the upper end thereof, a tool inclination adjusting member carried by said supporting member and arcuately movable about an axis intersecting axis of said spindle at right angles thereto and also said first axis at its intersection with the axis of said spindle, a tool-holding fixture carried by said tool inclination adjusting member adapted to hold a tool with its cutting edge in the vicinity of the point of intersection of said axes, and means for supporting a grinding wheel with its grinding face adjacent the point of intersection of said axes.

9. A tool grinder for grinding arcuate cutting edges about a pivot axis including a base, a pivot axis adjusting member carried by said base and arcuately movable about a first axis, a supporting member, a pivotal connection between said supporting member and said pivot axis adjusting member defining a pivot axis intersecting said first axis at right angles thereto, a tool inclination adjusting member carried by said supporting member and arcuately movable about an axis intersecting said pivot axes at right angles thereto and also said first axis at its intersection with the pivot axis, a tool-holding fixture carried by said tool inclination adjusting member adapted to hold a tool with its cutting edge in the vicinity of the point of intersection of said axes, a grinding wheel spindle adapted to rotatably support a grinding wheel with its grinding face adjacent the point of intersection of said axes, and means to reciprocate said grinding wheel spindle in order to move the grinding face of the grinding wheel back and forth across the cutting tool during the grinding operation.

10. The structure set forth in claim 9 wherein said means comprises a source of rotary power, a shaft rotatably driven by said source of power, a bar carried by said shaft eccentrically of its center, an adjusting knob at said one end of said bar, a retaining member on the other end of said bar having a pin fastened thereto offset from the center of said bar, a transversely slidable table mounted on said base and carrying said grinding wheel spindle, a lever pivoted to said pin at one end thereof and adapted to be connected to said table at the other end thereof, said bar being rotatable relative to said shaft in order to adjust the radial distance of said pin from the axis of said shaft, and lock means for securing said rod to said shaft for co-rotational movement whereby said pin is carried about the axis of said shaft during its rotation.

11. A tool grinder for grinding arcuate cutting edges about a pivot axis including a base having an arcuate supporting surface, a pivot axis adjusting member having an arcuate surface slidably resting on said base arcuate surface, said arcuate surfaces being disposed on a common circular cylinder having a first axis, a spindle rotatably housed by said pivot axis adjusting member and adjustable about a pivot axis intersecting said first axis at right angles thereto, a supporting member fixedly mounted on said spindle and having an arcuate supporting surface, a tool inclination adjusting member having an arcuate supporting surface resting on said supporting member arcuate surface, said last named arcuate surfaces being disposed on a common circular cylinder having an axis intersecting said pivot axis at right angles thereto and intersecting said first axis at its intersection with said pivot axis, a tool holding fixture carried by said tool inclination adjusting member adapted to hold a tool with its cutting edge in the vicinity of the point of intersection of said axes, and means for supporting a grinding wheel with its grinding face adjacent the point of intersection of said axes, said pivot axis adjusting member being pivotally adjustable about said first axis in order to vary the inclination of said pivot axis and said tool inclination adjusting member being pivotally adjustable about the axis of its arcuate surface in order to vary the inclination of a tool carried in said fixture relative to said pivot axis.

12. A tool grinder for grinding arcuate cutting edges about a pivot axis including a base, a supporting member pivotally mounted on said base, a tool inclination adjusting member supported on said supporting member and arcuately movable about an axis intersecting the pivot axis of said supporting member at right angles thereto, a tool-holding fixture supported on said tool inclination adjusting member adjustable about an axis intersecting the axis of said tool inclination adjusting member at right angles thereto, means for supporting a grinding wheel with its grinding face adjacent the point of intersection of said axes, and feed means for advancing said tool-holding fixture relative to the point of axis intersection and at right angles to the axis of said tool inclination adjusting member.

References Cited in the file of this patent

UNITED STATES PATENTS

| | | |
|---|---|---|
| 2,118,967 | Curtis | May 31, 1938 |
| 2,600,432 | Sanders | June 17, 1952 |